United States Patent
Tsukihashi et al.

(10) Patent No.: US 7,102,974 B2
(45) Date of Patent: Sep. 5, 2006

(54) OPTICAL HEAD OPTICAL OUTPUT SETTING METHOD AND OPTICAL DISK RECORDING APPARATUS

(75) Inventors: Akira Tsukihashi, Guma (JP); Yasushi Hanamoto, Hanyu (JP); Katsuki Hattori, Kiryu (JP)

(73) Assignee: Sanyo Electric Co., Ltd., Osaka (JP)

( * ) Notice: Subject to any disclaimer, the term of this patent is extended or adjusted under 35 U.S.C. 154(b) by 1196 days.

(21) Appl. No.: 09/799,400

(22) Filed: Mar. 5, 2001

(65) Prior Publication Data

US 2001/0026517 A1 Oct. 4, 2001

(30) Foreign Application Priority Data

Mar. 31, 2000 (JP) ........................................ 2000-098358

(51) Int. Cl.
*G11B 7/00* (2006.01)

(52) U.S. Cl. ................................. 369/53.24; 369/53.34; 369/53.37

(58) Field of Classification Search ............. 369/47.22, 369/47.23, 47.28, 47.31, 47.32, 47.33, 47.34, 369/53.24, 53.34, 53.44, 59.18, 59.19, 59.24, 369/47.3, 47.49, 47.5, 47.51, 47.52, 53.26, 369/53.31, 53.37

See application file for complete search history.

(56) References Cited

U.S. PATENT DOCUMENTS

| | | | | |
|---|---|---|---|---|
| 5,418,762 A | * | 5/1995 | Kitayama | ................ 369/13.02 |
| 6,198,707 B1 | * | 3/2001 | Yamamoto | ............... 369/47.25 |
| 6,356,520 B1 | * | 3/2002 | Hanamoto et al. | ......... 369/47.1 |
| 6,430,127 B1 | * | 8/2002 | Tsukihashi | ............... 369/47.33 |
| 6,442,115 B1 | * | 8/2002 | Shimoda et al. | ......... 369/47.28 |
| 6,560,180 B1 | * | 5/2003 | Tsukihashi et al. | ...... 369/53.31 |
| 6,584,053 B1 | * | 6/2003 | Tsukihashi | ............... 369/53.34 |
| 6,587,416 B1 | * | 7/2003 | Tsukihashi | ............... 369/59.14 |

* cited by examiner

Primary Examiner—Thang V. Tran
Assistant Examiner—Bach Q Vuong
(74) Attorney, Agent, or Firm—Hogan & Hartson LLP

(57) ABSTRACT

To provide a method for optimizing the optical output from an optical head when recording data onto an optical disk, each time a suspension of data recording onto the disk is determined, the optical head reads data recorded onto the disk before the suspension, and recording state of this data is judged. Based on the judged recording state, the optical output from the optical head to be emitted when resuming the data recording is controlled. A timing at which to suspend data recording can be desirably set, so that the recording state of the recorded data in the disk can be judged at desirable timing in data recording operation, so that the optical output from the optical head is controlled based on the judged recording state.

4 Claims, 1 Drawing Sheet

OPTICAL HEAD OPTICAL OUTPUT SETTING METHOD AND OPTICAL DISK RECORDING APPARATUS

BACKGROUND OF THE INVENTION

1. Field of the Invention

The present invention relates to an optical disk recording apparatus recording data onto a disk using an optical beam emitted from an optical head. In particular, the present invention relates to an optical disk recording apparatus which records data onto a disk while correcting an optical output from an optical head according to the variation of recording sensitivity of the disk.

2. Description of the Related Art

CD-R (recordable) drives and CD-RW (rewritable) drives are conventionally well known optical disk recording apparatuses recording digital data onto a disk using an optical beam from an optical head. Both relate to types of CD (compact disk) technology.

Disks for use in recording with such optical disk recording apparatuses may differ from one another in recording sensitivity, depending on composition or manufacturer. Even among the products manufactured by the same manufacture, they may differ in recording sensitivity due to manufacturing variation. Even in a single disk, different portions may have different sensitivities.

In data recording, an optical output emitted from the optical head of such an optical disk recording apparatus is set at an optimum level for the data recording.

The optimum recording level is determined so as to compensate for variations in recording sensitivity among disks.

The setting of the optical output at the optimum recording level is achieved through trial writing onto a calibration area while stepwisely changing the level of the optical output, the calibration area being preserved in a disk separately from a program area for use in actual data writing.

In addition, the reflection level of a recording pulse is determined during data recording operation, and the optical output is corrected according to the determined reflection level, so that the resultant optical output is set at the recording level optimum for actual data recording.

However, these methods for setting an optical output at the optimum recording level cannot always set the optical output at a true optimum recording level because the methods do not actually judge the recording state of the data recorded in the disk. Moreover, where increase of a recording speed of an optical disk recording apparatus has recently been attempted, advancement of the increase results in narrowing the width of a recording pulse, making it difficult to determine the reflection level of a recording pulse. As a result, it becomes difficult to correct the optical output at the optimum recording level in actual data recording operation.

SUMMARY OF THE INVENTION

A type of currently available optical disk recording apparatus enables recording of data onto a disk so as to be continued, in terms of data, from data recorded in the disk without leaving a substantial trace of linkage. According to the present invention, when applied to such an optical disk recording apparatus, suspension and resuming of data recording onto a disk is determined; the data having been recorded onto the disk immediately before the suspension of data recording (hereinafter referred to as "recorded data immediately before data recording suspension") is read by the optical head at every determination to suspend the data recording to judge the recording state of the data read; and the optical output from the optical head is controlled according to the judged recording state when resuming the data recording. This arrangement makes it possible to control the optical output of an optical head so as to set at the optimum recording level through actual judgement of the recording state of the recorded data in the disk every time data recording is suspended or resumed. In this manner, data recording suspension timing can be desirably set and the recording state of the recorded data in the disk can be judged at a desirable timing during data recording operation for controlling the optical output from the optical head.

BRIEF DESCRIPTION OF THE DRAWING

The above and other objects, features, and advantages of the present invention will become further apparent from the following description of the preferred embodiment taken in conjunction with the accompanying FIG. 1, which is a circuit block diagram illustrating a preferred embodiment in which an optical disk recording apparatus and an optical head optical output setting method of the present invention are realized in application to a CD-R drive.

DESCRIPTION OF THE PREFERRED EMBODIMENTS

Figure 1:
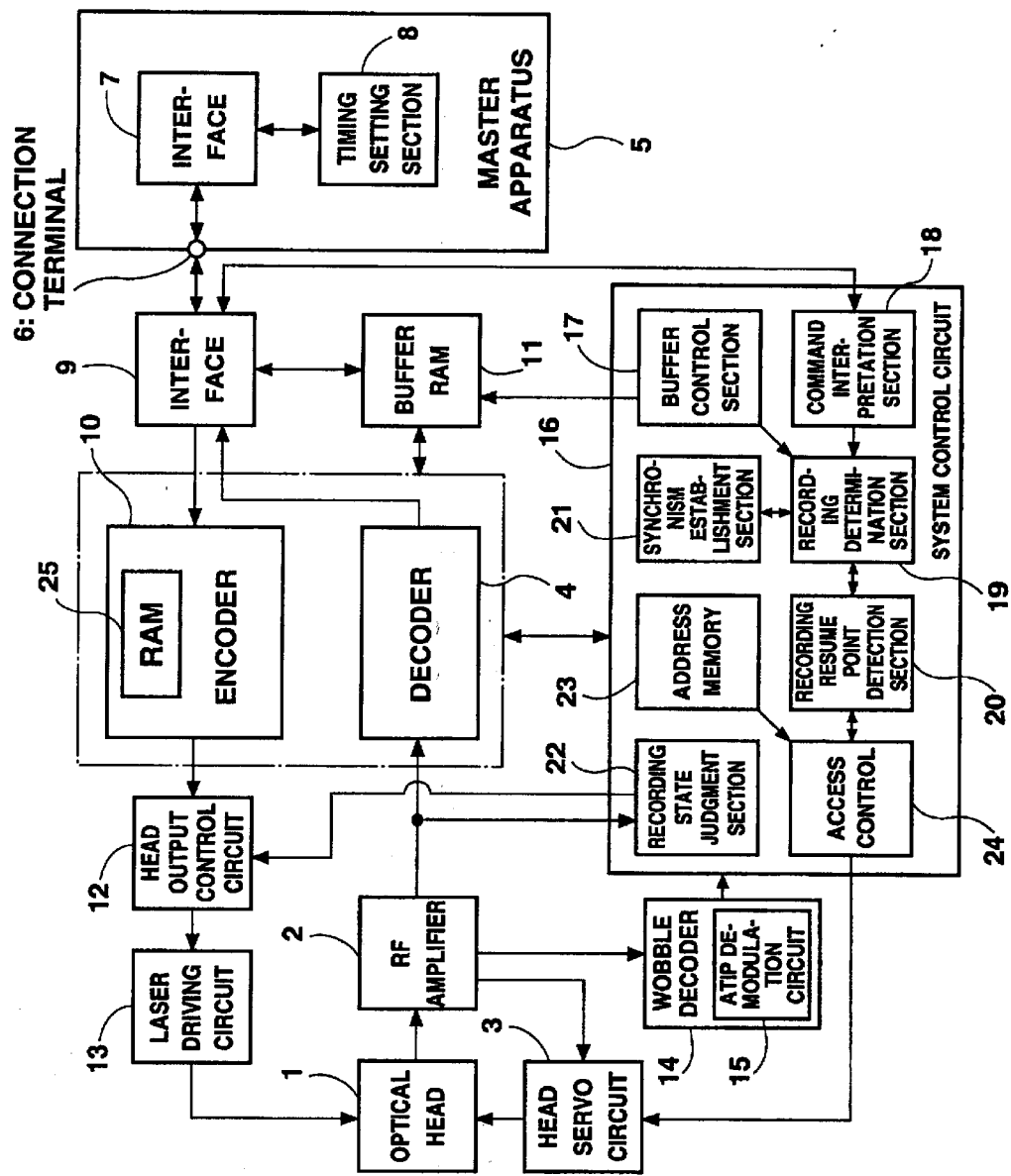

FIG. 1 is a circuit block diagram illustrating a preferred embodiment in which an optical disk recording apparatus and an optical head optical output setting method of the present invention are applied to a CD-R drive.

Referring to FIG. 1, an optical head 1 emits a laser beam for tracing the signal track of a disk for data writing and reading with respect to the disk.

An RF amplifier 2 amplifies an RF signal (a radio frequency signal), which is a signal concerning a received light (i.e., a received light output), output from the optical head 1 and then binarizes the amplified RF signal. A head servo circuit 3 feeds back to the optical head 1 output signal of various types output from the optical head 1, for focusing control, tracking control, and thread feeding control. Through focusing control, the laser beam from the optical head 1 is focused on the signal plane of the disk. Through tracking control, the laser beam tracks the signal track of the disk. Through thread feeding control, the optical head 1 is moved in the radial direction of the disk.

A decoder 4 demodulates the binary data of an RF signal from the RF amplifier 2 in synchronism with a bit clock. Specifically, the decoder 4 carries out EFM demodulation with respect to the binary data of an RF signal in accordance with a demodulation code in CD standard, or EFM (eight to fourteen modulation). The decoder 4 also conducts demodulation with respect to various data according to their structures.

A master apparatus 5, such as a personal computer, has an interface 7 for controlling data exchange via a connection terminal 6. As recording application software for CD-R has been loaded to the master apparatus 5, a timing setting section 8 is formed by means of the software, for setting timing at which to suspend data recording onto a disk to judge the recording state of data read from the disk.

The interface 9 controls data exchange with the master apparatus 5. An encoder 10 encodes data supplied via the interface 9 into data having a structure suitable for recording onto a disk (i.e., recording data), and modulates the data into EFM data corresponding to a modulation code in CD standard.

A buffer RAM 11 temporarily stores the data supplied via the interface 9, and is used as a memory in data modulation into recording data by the encoder 10. The buffer RAM 11 also temporarily stores data read from a disk, and is used as a memory in demodulation with the read data by the decoder 4.

A head output control circuit 12 emits a control output for controlling a laser beam from the optical head 1 based on the EFM recording data output from the encoder 10. A laser driving circuit 13 drives the laser source of the optical head 1 for data recording onto a disk according to a control output from the head output control circuit 12.

Specifically, in the laser driving circuit 13, the head output control circuit 12 controls such that the optical output from the laser source of the optical head 1 is set at an appropriate recording level for data recording onto a disk in a data recording operation.

When the laser driving circuit 13 is driving the laser source of the optical head 1 to emit a laser light, a recording data signal "1" is recorded onto a disk. When the laser driving circuit 13 drives the laser source of the optical head 1 to not emit a laser light, a recording data signal "0" is recorded onto a disk.

A wobble decoder 14 demodulates a push-pull signal, prepared in the RF amplifier 2 using a push-pull method, to extract a 22.05 kHz wobble signal therefrom, which is originally contained in the pre-groove of a disk, and generates a clock necessary for disk rotation control. The wobble decoder 14 has an ATIP demodulation circuit 15 for demodulating a wobble signal to restore an ATIP (absolute time in pre-groove).

A system control circuit 16 is responsible for system control in connection with data recording and reproduction with respect to a disk. The system control circuit 16 comprises a buffer control section 17, a command interpretation section 18, a recording determination section 19, a recording resume point detection section 20, a synchronism establishment section 21, and a recording state judgement section 22. The buffer control section 17 controls data writing and reading with respect to the buffer RAM 11. The command interpretation section 18 interprets a command supplied from the master apparatus 5. The recording determination section 19 determines whether to suspend data recording onto a disk in response to a command which is interpreted in the command interpretation section 18 as instructing timing for halting or suspending data recording onto a disk, or according to an amount of data having been accumulated in the buffer RAM 11 under control by the buffer control section 17. The recording resume point detection section 20 detects a point on the disk, continued from the end of the data having been recorded onto the disk by suspension of the data recording, for use as a point at which to resume data recording in response to a determination by the recording determination section 19 to resume data recording. The synchronism establishment section 21 synchronizes recording data to be newly recorded onto a disk with the data recorded on the disk when the recording resume point detection section 20 detects a point at which data recording is to resume. The recording state judgement section 22 causes the optical head 1 to read recorded data immediately before data recording suspension to judge the recording state of the data read every time the recording determination section 19 determines to suspend data recording.

Specifically, the recording state judgement section 22 judges formation state of the recorded data immediately before data recording suspension based on the level of a reflected light, as determined based on a received light output, obtained in the optical head 1 when it reads the data from the disk, and thereafter controls the head output control circuit 12 based on the recording state determined based on the judgement result, for setting the optical output from the optical head 1 to be emitted when resuming the data recording.

More specifically, a reference voltage is pre-registered in the recording state judgement section 22. The reference voltage is a reflected light voltage corresponding to an amount of reflected light received by the optical head 1 under condition in which reproduction data obtained when the optical head 1 reads data from a disk, which was recorded onto the disk using a predetermined standard apparatus and disk, has the smallest error rate. The recording state judgement section 22 determines a relative increase/decrease amount (change amount) with respect to the reference voltage, of a reflected light voltage corresponding to the amount of reflected light received by the optical head 1 tracing the signal plane of the disk_with the data read being reproduced. The determination of the change amount is regarded as judgement of the formation state of recorded data. Based on the determined change amount, the recording state judgement section 22 controls the head output control circuit 12 such that the optical output from the optical head 1 in data recording is set at the optimum recording level so that recording data can be recorded onto the disk so as to produce reproduction data with the minimum error rate. That is, the optical output of the optical head 1 is set as above based on the actual recorded data.

Next, recording operation of an optical disk recording apparatus configured as described above will be described.

When the master apparatus 5, connected to the connection terminal 6, supplies data to be recorded, the data is received in the interface 9, and written into the buffer RAM 11.

When the data has been written into the buffer RAM 11 to an amount determined as an amount to trigger encoding operation by the encoder 10, reading of data stored in the buffer RAM 11 begins, and the read data is encoded in the encoder 10 into EFM recording data to be recorded onto a disk in EFM frame units.

When the optical head 1, tracing on the signal plane, has reached a point at which data recording is to start, the encoder 10 starts sequential output of recording data in EFM frame units. Thereafter, address data on an ATIP address corresponding to the output recording data is sequentially updated and stored in the address memory 23 in the system control circuit 16, the ATIP address being restored in ATIP demodulation circuit 15.

The laser driving circuit 13 drives the laser source of the optical head 1 based on the recording data output from the encoder 10, so that the recording data is written onto the disk.

Here, timing for suspending data recording during data recording operation is set using the master apparatus 5.

Specifically, the master apparatus 5 can set, using the timing setting section 8, a timing at which to suspend data recording in units of capacity of data to be recorded onto a disk (e.g., every 50M bytes) and/or in units of an amount of time for data recording onto a disk (e.g., every one, five, or ten minutes).

When timing for data recording suspension is set using the timing setting section 8, a command based on that setting is issued and input via the interfaces 7 and 9 to the command interpretation section 18 for interpretation. According to the interpretation, the recording determination section 19 instructs suspension of data recording onto a disk. That is, the recording determination section 19 instructs data recording suspension according to the timing having been set using the timing setting section 8.

When the recording determination section 19 determines to suspend data recording, the encoder 10, having continued data output to an appropriate breakpoint, suspends output of recording data. Also, the head output control circuit 12 halts generation of a control output for controlling the laser driving circuit 13, and the optical head 1 thus halts emission of a recording laser. This results in suspension of data recording onto the disk. In this case, a link block (run-out) for linking the recording data is not generated in the encoder 10. Thus, the data recording onto a disk is suspended without any link data being recorded.

After the data recording is suspended, the head output control circuit 12 sets the optical output from the optical head 1 at a predetermined reproduction level. In addition, the access control section 24, referring to the address data in the address memory 23, controls the optical head 1 to have it access the data recording area on the disk, into which data was written immediately before the suspension, so that the optical head 1 reads data from that area.

Here, an area from which the optical head 1 reads data need not cover the entire data recording area into which data was written immediately before the data recording suspension, and may be a continuous section or discrete sections of that data recording area.

After the optical head 1 reads recorded data recorded immediately before data recording suspension, the recording state judgement section 22 judges the recording state of that data based on the data read, and the output control circuit 12 then controls the laser driving circuit 13 according to the judged recording state.

In other words, the optical output from the optical head 1 to be emitted when resuming data recording can be corrected according to the recording state of the recorded data immediately before data recording suspension.

Consequently, the optical output from the optical head 1 to be emitted when resuming data recording is corrected to be set at the optimum recording level so that recording data is recorded onto the disk so as to produce reproduction data with a small error rate.

After the optical output from the optical head 1 is set as described above, the recording determination section 19 determines to resume data recording. This procedure is applied to a case where data recording is suspended in response to a data recording suspension instruction from a master apparatus. Should data recording be suspended for any other reason (e.g., buffer under-run), data recording is resumed when the optical output from the optical head 1 is set and the cause (such as buffer under-run) of the suspension is solved.

When the recording determination section 19 determines to resume data recording, the encoder 10 begins preparation to output recording data for subsequent data recording, i.e., recording data continuing from the data which the encoder 10 output last immediately before the data recording suspension.

In the above, data in an internal RAM 25, incorporated into the encoder 10, is used for ensuring an CIRC interleave length (108 EFM framed at the maximum) to the recording data output from the encoder 10 immediately after resuming the data recording, and the encoder 10 generates recording data continued from the data which the encoder 10 output last immediately before the data recording suspension.

In addition, in response to the determination by the recording determination section 19 to resume data recording, the recording resume point detection section 20 detects the end of the data having been recorded onto the disk by the data recording suspension, while the beginning of a data recording area continued from the detected end, where no data is yet recorded, is used as a point at which data recording is to resume.

Specifically, to detect a point at which to resume data recording, the access control section 24, referring to the address data in the address memory 23, causes the optical head 1 to access a sub-code frame at an address prior by one to the sub-code address corresponding to the address data being referred to, and detects a frame synchronous signal to thereby count EFM frames until it detects the last EFM frame of the sub-code frame. Upon detection of a frame synchronous signal of the last EFM frame, the access control means 24 counts bit clocks so that the recording resume point detection section 20 can detect the end of the data recorded in the disk. The beginning of a blank area continued from the end of the recorded data in the disk is used as a point at which to resume data recording.

It should be noted that the detection of a point at which to resume data recording may preferably be made at the same time as judgement on the recording state of recorded data immediately before data recording suspension. Specifically, as the recorded data immediately before data recording suspension is read using the optical head 1 in the detection of the beginning of a blank area, made when resuming the data recording, as described above, the recording state judgement section 22 judges the recording state of the recorded data immediately before data recording suspension based on the result of the data reading by the optical head 1. Subsequently, based on the result of judgement on the recording state, the optical output from the optical head 1 to be emitted when resuming the data recording is set. This procedure enables simultaneous execution of the detection of a point at which to resume data recording and the judgement concerning the recording state of the recorded data. This contributes to reduction of the entire processing time and of power consumption.

In detection of a data recording resume point, the decoder 4 carries out decoding operation in synchronism with a reproduction clock reproduced from EFM data. Meanwhile, the synchronism establishment section 21 causes the encoder 10 to carry out encoding operation in synchronism with a reproduction clock. Consequently, synchronism is established between recorded data in the disk and recording data from the encoder 10.

Once a point at which to resume data recording is detected, the encoder 10 switches to operate according to a recording clock rather than a reproduction clock. The recording clock is either a reference clock with quartz accuracy, generated in a PLL (phase lock loop) circuit, or a system clock in synchronism with a bit clock of a wobble component.

After the switch to a recording clock, the encoder 10 conducts encoding operation in synchronism with a recording clock. Meanwhile, the head output control circuit 12 outputs a control output based on the recording data, which is generated in the encoder 10 for recording onto the disk so as to be continued from the recorded data therein. Consequently, recording of the recording data onto a disk begins in synchronism with the recorded data in the disk, beginning with the beginning of the blank area. In this case, no link block is generated in the encoder 10 for recording data linkage (LINK and run-in). Thus, data recording resumes without the recording of a link block.

With the above processing, accurate synchronism can be established between the data having been recorded onto the disk by data recording suspension and the recording data for subsequent data recording. It is also possible, while ensuring the continuity between before and after the linkage between the recorded data and the recording data, that the recording state of the recorded data having been recorded immediate before the data recording suspension is judged at desirable timing and set using the timing setting section 8, and that the optical output from the optical head 1 is controlled based on the judged recording state of the recorded data.

When timing of the suspension of data recording is set using the timing setting section 8 in data amount units, the recording state of recorded data is judged at timing when data has been stored onto a disk to the predetermined data amount, and the optical output from the optical head is controlled accordingly. Meanwhile, when the timing is set in units of time, the recording state of recorded data is judged at timing when the predetermined amount of time has elapsed, and an optical output from the optical head is controlled accordingly.

It should be noted that, as no link block is required between recorded data and recording data, the recording capacity of a disk can be effectively utilized.

As described above, in this embodiment, data recording onto a disk is forcibly suspended every suspension timing set using a master apparatus, and the recording state of the recorded data immediately before the data recording suspension is judged during an interval after the suspension and before resuming of the data recording, so that the level of the optical output from the optical head is set based on the judgement result. This makes it possible to reliably determine the actual recording state of the recorded data in a disk during an interval after suspension and before resuming of the data recording onto the disk even though data is recorded in a high speed. Consequently, the optical output can be controlled according to the determined data recorded state.

As described above, according to the present invention, the optical output from the optical head can be set at an optimum recording level for data recording through actual judgement of the recording state of the recorded data in a disk at desirable timing during data recording operation. This arrangement enables high quality recording of data onto various types of media having different recording sensitivities, as well as onto a single disk over its entire data recording area. In addition, timing for judging the data recording state can be set in units of data amount recorded onto a disk or an amount of time for data recording.

Further, as data recording suspension timing can be switched using a master apparatus, data recording suspension timing can be readily set using a recording application software. A great deal of freedom in setting the timing of data recording suspension is possible. Timing can be set by an easy operation.

What is claimed is:

1. An optical head optical output setting method for use with an optical disk recording apparatus for conducting data recording onto a disk using an optical beam from an optical head and capable of suspending and resuming the data recording, comprising the steps of:

reading data using the optical head for every determination to suspend the data recording, to judge recording state of the data read, the data being recorded onto the disk immediately before associated suspension of data recording; and setting an optical output from the optical head to be emitted when resuming the data recording according to the recording state judged;

wherein data recording is suspended for every recording of a predetermined amount of data onto a disk.

2. An optical head optical output setting method for use with an optical disk recording apparatus for conducting data recording onto a disk using an optical beam from an optical head and capable of suspending and resuming the data recording, comprising the steps of:

reading data using the optical head for every determination to suspend the data recording, to judge recording state of the data read, the data being recorded onto the disk immediately before associated suspension of data recording; and setting an optical output from the optical head to be emitted when resuming the data recording according to the recording state judged;

wherein data recording is suspended after every elapse of a predetermined amount of time during data recording operation.

3. An optical disk recording system for conducting data recording onto a disk using an optical beam from an optical head, comprising:

a recording apparatus for conducting the data recording onto the disk;

a master apparatus for supplying data for recording to the recording apparatus, wherein the master apparatus includes a command issuing section for issuing a data recording suspension command to the recording apparatus, and the recording apparatus includes recording determination section for determining suspension and resumption of e data recording, and for determining to suspend data recording in response at least to receipt of the data recording suspension command from the master apparatus; recording suspension section for suspending the data recording in response to a determination made by the recording determination section to suspend the data recording; recording state section for causing the optical head to read data recorded onto the disk immediately before suspension of the data recording, determined by the recording suspension section, to judge the recording state of the data read based on a result of data reading by the optical head, and to set a level of an optical output from the optical head to be emitted when resuming the data recording; and recording resume section for resuming data recording beginning with a beginning of an unrecorded area on the disk, continued from the data recorded onto the disk immediately before the suspension of the data recording, in response to a determination made by the recording determination section to resume the data recording, while controlling the optical head according to the level of the optical output, as set by the recording state judgment section;

wherein the command issuing section receives a user instruction concerning a condition for determining a timing at which to issue the data recording suspension command, and issues the data recording suspension command for every interval satisfying the received condition;

wherein the command issuing section receives information concerning an interval between successive issues of data recording suspension commands as the condition for determining the timing at which to issue the data recording suspension command, in which the interval being expressed in a form of an amount of data to be recorded onto the disk.

4. An optical disk recording system for conducting data recording onto a disk using an optical beam from an optical head comprising:

a recording apparatus for conducting the data recording onto the disk;

a master apparatus for supplying data for recording to the recording apparatus, wherein the master apparatus includes a command issuing section for issuing a data recording suspension command to the recording apparatus, and the recording apparatus includes recording determination section for determining suspension and resumption of e data recording, and for determining to suspend data recording in response at least to receipt of the data recording suspension command from the master apparatus; recording suspension section for suspending the data recording in response to a determination made by the recording determination section to suspend the data recording; recording state judgment section for causing the optical head to read data recorded onto the disk immediately before suspension of the data recording, determined by the recording suspension section, to judge the recording state of the data read based on a result of data reading by the optical head, and to set a level of an optical output from the optical head to emitted when resuming the data recording; and recording resume section from resuming data recording beginning with a beginning of an unrecorded area on the disk, continued from the data recorded onto the disk immediately before the suspension of the data recording; in respone to a determination made by the recording determination section to resum the data recording, while controlling the optical head recording to the level of the optical output, as set by the recording state judgment section;

wherein the command issuing section receives a user instruction concerning a condition for determining a timing at which to issue the data recording suspension command, and issues the data recording suspension command for every interval satisfying the received condition;

wherein the command issuing section receives information concerning an interval between successive issues of data recording suspension commands as the condition for determining the timing at which to issue the data recording suspension command, in which the interval being exposed in a form of an amount of data to be recorded onto the disk;

wherein the command issuing section receives information concerning an interval between successive issues of data recording suspension commands as the condition for determining the timing at which to issues the data recording suspension command, in which the interval being expressed in a form of a unit time amount.

* * * * *